(No Model.)
J. PARENT.
FIFTH WHEEL.
No. 554,533. Patented Feb. 11, 1896.
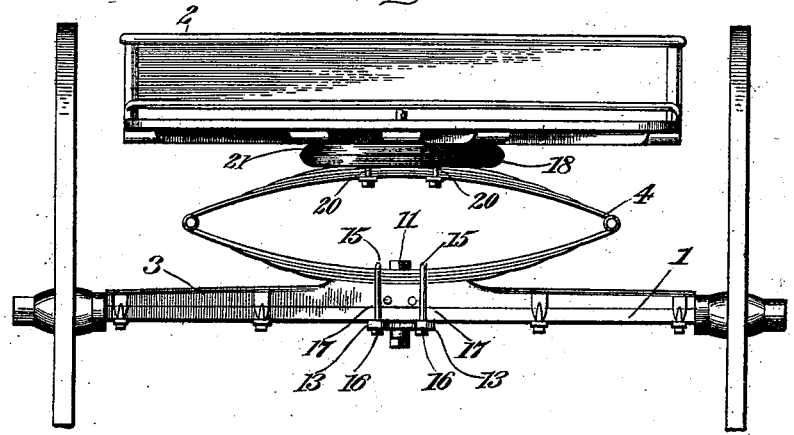
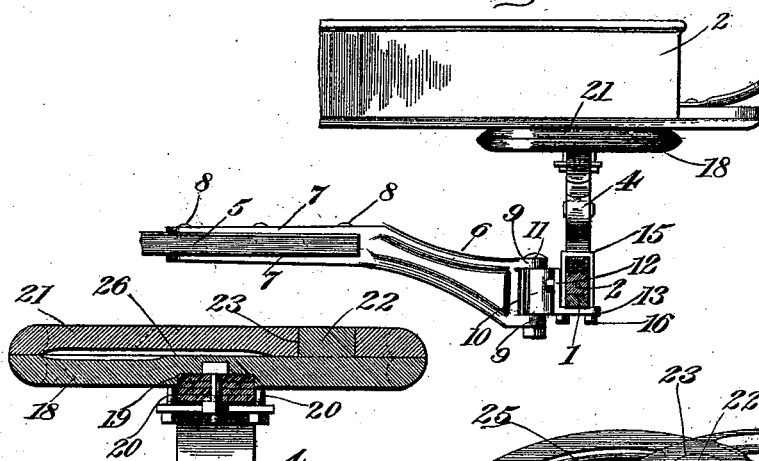
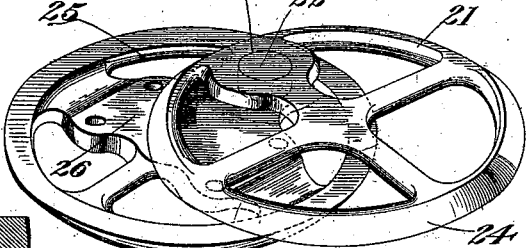
Witnesses
M E Fowler
Inventor
John Parent
By Joseph T Attius
Attorney

UNITED STATES PATENT OFFICE.

JOHN PARENT, OF BRUNSWICK, MAINE.

FIFTH-WHEEL.

SPECIFICATION forming part of Letters Patent No. 554,533, dated February 11, 1896.

Application filed June 17, 1895. Serial No. 553,082. (No model.)

*To all whom it may concern:*

Be it known that I, JOHN PARENT, of Brunswick, county of Cumberland, State of Maine, have invented certain new and useful Improvements in Wagons, of which the following is a specification, reference being had to the accompanying drawings.

The object of my invention is to produce such improvements in the turning-gear of spring-wagons or like vehicles as will simplify the construction, reduce the cost of manufacture, and enable the wagon to turn in a narrower space than the ordinary wagon requires.

In the accompanying drawings, Figure I is a front elevation of the front part of a wagon embodying my invention. Fig. II is a side elevation of so much of a wagon as is necessary to illustrate my invention. Fig. III is a central vertical section through the fifth-wheel and the pivotal perch. Fig. IV is a perspective view of the fifth-wheel detached, showing the upper circle turned upon the lower circle to illustrate the office of the bearing-surface 26.

Referring to the figures on the drawings, 1 indicates the front axle of a wagon, and 2 the bed or body part.

3 indicates the ordinary bed-piece secured to the axle proper, and 4 an elliptical spring that is set directly upon the bed-piece.

5 indicates an ordinary perch and 6 the perch-head. The perch-head consists preferably of a downwardly-inclined steel or iron forging, which is provided at its rear end with legs 7 that are separated by a suitable distance to fit the perch 5 which it spans, and to which it is secured, as by bolts 8. At its forward end the perch-head is provided with lugs 9, which receive between them the perch-block 10.

11 indicates a bolt that passes through holes in the lugs 9 and is secured to them. It affords a pivotal connection for the perch-block 10. The perch-block is preferably made of a strong steel or iron forging and is provided with a flanged base 12 that abuts against the rear of the bed-piece 3, and with bottom plates 13 which pass underneath the axle. The plates are provided with apertures 14, which receive the ends of straps 15 that pass round the bottom member of the elliptical spring 4 around the axle and the bed-piece and serve to secure all the parts firmly together, as by nuts 16, on their extremities. Bolts 17 are also provided for additional security and pass through bolt-holes in the bed-piece 3 and into the base 12 of the perch-block.

By the employment of the downwardly-inclined perch-head, a strong and durable means of effecting a pivotal connection between the perch and the front axle is provided, while, at the same time, the device may be accommodated to any relative difference of height between the front and rear axles, although in practice such difference is less than in the ordinary wagon, as will hereinafter appear.

18 indicates the lower circle of a fifth-wheel that is provided upon its bottom with a transverse channel 19 into which the upper member of the spring 4 closely fits, and to which it is securely united, as by bolts 20.

21 indicates the upper circle of the fifth-wheel, that, as by bolts or other suitable means, is firmly united to the bottom frame-pieces of the wagon-bed. One of the circles of the fifth-wheel, preferably the lower one, is provided with an eccentric pivotal stud 22, and the other circle is provided with a pivot-bore 23. As defined, the pivot of my fifth-wheel is eccentric, and is in practice located in direct alignment with the pivot-bolt 11, which unites the perch-head to the perch-block.

24 and 25 indicate the bearing-rings of the upper and lower circles, respectively.

26 indicates a broad flat bearing-surface in the plane of the surface of the ring 25, and affords a firm support and bearing for the upper circle upon the lower, when the lower circle is turned upon the pivot 22, thus providing at all times a firm bearing and support for the wagon-body upon the fifth-wheel.

What I claim is—

1. In a vehicle, the combination with its front axle, and an elliptical spring secured thereto, of a bed, the upper circle of a fifth-wheel secured thereto, and the lower circle of a fifth-wheel normally concentric with the upper circle of the fifth-wheel and eccentrically pivoted thereto, and means for securing the lower circle to the spring, substantially as specified.

2. In a vehicle, the combination with the front axle and spring, of the lower circle of a fifth-wheel centered above the front axle, the upper circle of the fifth-wheel normally concentric with the lower circle, of an eccentric pivotal connection between the circles, said pivotal connection being in the rear of the axle, and a bed or body secured to the upper circle, substantially as specified.

3. In a vehicle, the combination with the bed and front axle, of a fifth-wheel consisting of an upper and lower circle centered directly over the front axle, an eccentric pivotal connection between the upper and lower circles of the fifth-wheel, a reach entirely separate from the fifth-wheel and pivoted behind the front axle, the pivotal connection of the reach and the pivotal connection of the fifth-wheel being concentric, substantially as specified.

4. In a fifth-wheel of a vehicle, the combination with upper and lower circles and bearing-rings on each, of an eccentric pivotal connection between the two, and a broad bearing-surface upon the lower circle adapted to sustain the bearing-ring of the upper circle, when in turning it leaves the bearing-ring of the lower circle, substantially as set forth.

In testimony of all which I have hereunto subscribed my name.

JOHN PARENT.

Witnesses:
  JAMES L. DOOLITTLE,
  CLARENCE E. SAWYER.